United States Patent [19]

Takizawa

[11] Patent Number: 5,048,650

[45] Date of Patent: Sep. 17, 1991

[54] ENGINE BRAKE RUNNING CONTROL FOR AUTOMATIC TRANSMISSION IN AUTOMATIC DRIVE RANGE

[75] Inventor: Satoshi Takizawa, Yokosuka, Japan

[73] Assignee: Nissan Motor Co., Ltd., Yokohama, Japan

[21] Appl. No.: 381,073

[22] Filed: Jul. 18, 1989

[30] Foreign Application Priority Data

| Jul. 19, 1988 | [JP] | Japan | 63-178055 |
| Jul. 19, 1988 | [JP] | Japan | 63-178056 |
| Aug. 2, 1988 | [JP] | Japan | 63-192007 |

[51] Int. Cl.$^5$ .......................................... F16H 59/54
[52] U.S. Cl. .................................... 192/4 A; 74/866; 74/877
[58] Field of Search ............... 74/854, 856, 866, 869, 74/846, 858, 859, 877; 364/424.1; 192/4 A, 9

[56] References Cited

U.S. PATENT DOCUMENTS

| 4,335,428 | 6/1982 | Miki et al. | 364/424.1 |
| 4,561,327 | 12/1985 | Niwa et al. | 364/424.1 X |
| 4,576,065 | 3/1986 | Speranza et al. | 74/866 |
| 4,680,992 | 7/1987 | Hayasaki et al. | 74/869 |
| 4,696,380 | 9/1987 | Kita | 192/4 A |
| 4,771,657 | 9/1988 | Iwatsuki | 364/424.1 X |
| 4,829,435 | 5/1989 | Isono | 74/866 X |
| 4,846,022 | 7/1989 | Ito et al. | 74/866 |
| 4,966,049 | 10/1990 | Takahashi | 74/866 |

FOREIGN PATENT DOCUMENTS

| 0046150 | 4/1981 | Japan | 74/861 |
| 1529480 | 10/1978 | United Kingdom | 74/866 |

*Primary Examiner*—Allan D. Herrmann
*Assistant Examiner*—Khoi Q. Ta
*Attorney, Agent, or Firm*—Foley & Lardner

[57] ABSTRACT

An engine brake running control has been improved such that when the brake pedal is released, the original engine brake running control instruction is slightly modified to meet the driver's demand. For example, the originally set instruction of effecting engine brake running at the second gear position is cancelled or replaced with the engine brake running instruction at the third gear position.

20 Claims, 11 Drawing Sheets

ENGINE BRAKE RUNNING CONTROL FOR AUTOMATIC TRANSMISSION IN AUTOMATIC DRIVE RANGE

RELATED APPLICATIONS

U.S. patent application Ser. No. 07/336,431 in the name of Satoshi TAKIZAWA, filed on Apr. 11, 1989;

U.S. patent application Ser. No. 07/342,144 in the name of Satoshi TAKIZAWA, filed on Apr. 24, 1989; and U.S. patent application Ser. No. 07/375,967 in the name of Satoshi TAKIZAWA, filed on July 6, 1989 claiming priority based on JP63-166984.

BACKGROUND OF THE INVENTION

The present invention relates to an engine brake running control for an automatic transmission when the automatic transmission operates in an automatic drive range, viz., a "D" range.

An automatic transmission of the E4N71B type is known. This automatic transmission is manufactured by Nissan Motor Company Limited in Japan and described in a publication "NISSAN AUTOMATIC TRANSMISSION L4N71B TYPE, E4N71B TYPE, SERVICE MANUAL 1982 (A261C04)" issued by Nissan Motor Company Limited on November in 1982. This known transmission comprises a downshift solenoid, a shift switch, an idle switch, a vehicle speed sensor, a brake switch, and a control unit. As described on page 12 of the above-mentioned publication, the downshift solenoid is rendered ON when the shift switch indicates that the third gear position is established in D range, the vehicle speed sensor detects a vehicle speed falling in a predetermined range from 30 km/h to 50 km/h, the brake switch is rendered ON, and the idle contacts of the throttle switch are rendered ON. According to this known downshift control, whenever the above mentioned conditions are met, a downshift is made to the adjacent one low gear position, and further downshift will not be made. Thus, if more effective engine brake is needed, it is necessary to shift a manual selector to a manual select range position, such as "2" range or "1" range.

The Applicant has proposed in the above-mentioned U.S. patent application Ser. No. 07/342,144 filed on Apr. 24, 1989 how to determine a new gear position which an automatic transmission should be downshifted to and conditioned for an engine brake running when the automatic transmission operates in a D range (an automatic drive range). According to this previous proposal, the new gear position is determined in response to a deceleration which the automotive vehicle is subject to after a brake pedal has been depressed. More specifically, predetermined deceleration values are provided for different gear positions and an appropriate one of them which corresponds to the present gear position which the automatic transmission is conditioned in is selected and compared with the actual deceleration detected. In response to the result of this comparison, a new gear position lower than the present gear position is determined.

An object of the present invention is to improve the previously proposed engine brake running control such that when the brake pedal is released after the engine brake running state has been established, the degree of deceleration which the automotive vehicle is subject to is at least restrained to improve a ride feel.

SUMMARY OF THE INVENTION

According to one aspect of the present invention, there is provided an engine brake running control system for an automotive vehicle including a brake pedal, and an automatic transmission, the automatic transmission being shiftable from one gear position down to another adjacent low gear position, the another gear position being determined in accordance with a predetermined shift schedule when the automatic transmission operates in a predetermined automatic drive range, the engine brake running control system comprising; means for detecting a depression of the brake pedal and generating a brake pedal depression indicative signal indicative of said depression of the brake pedal, means for detecting a present gear position which the automatic transmission is conditioned in and generating a present gear position indicative signal indicative of the present gear position detected, means for selecting, out of a predetermined group of gear positions which are lower than the present gear position, a new gear position which the automatic transmission should be downshifted to upon presence of said brake pedal depression indicative signal when the automatic transmission operates in the automatic drive range, the selecting means selecting the new gear position in accordance with the present gear position indicative signal and at least one predetermined variable which the automotive vehicle is involved in, said predetermined group of gear positions including a predetermined gear position lower than the another gear position, means for effecting a downshift from the present gear position in the automatic transmission to said new gear position to condition the same in a state for engine brake running at said new gear position when the automatic transmission operates in the automatic drive range, and means for preventing the automatic transmission from being conditioned for engine brake running at said predetermined gear position upon absence of said depression indicative signal when the automatic transmission operates in the automatic drive range.

According to another aspect of the present invention, there is provided an engine brake running control system for an automotive vehicle including a brake pedal, and an automatic transmission, the automatic transmission being shiftable from one gear position down to another adjacent low gear position, the another gear position being determined in accordance with a predetermined shift schedule when the automatic transmission operates in a predetermined automatic drive range, the engine brake running control system comprising; means for detecting a demand for engine brake running of the automotive vehicle when the automatic transmission operates in the predetermined automatic drive range (D range); means for detecting a present gear position which the automatic transmission is conditioned in; means for setting one of a first gear position indicator (FDS3) and a second indicator (FDS2) in response to the present gear position detected and the degree of the demand for engine brake running when the demand for engine brake running is detected, the said first gear position indicator being indicative of the another gear position, the second indicator being indicative of a predetermined gear position lower than the another gear position, means for comparing the another gear position that is determined according to the predetermined shift schedule and the gear position indicated by said one gear position indicator that is set and setting as a new gear position a lower one of the another gear position that is determined according to the predetermined schedule and the gear position indicated by said one gear position indicator that is, means for shifting the automatic transmission from the present gear position down to said new gear position, means for conditioning the automatic transmission in a state for engine brake running when one of said first and second gear position indicators is set, means for detecting a release of the brake pedal after said demand for engine brake running has been detected, and means for resetting said second gear position indicator when said release of the brake pedal is detected.

According to still another aspect of the present invention, there is provided a method for engine brake running control for an automotive vehicle including a brake pedal, and an automatic transmission, the automatic transmission being shiftable from one gear position down to another adjacent low gear position, the another gear position being determined in accordance with a predetermined shift schedule when the automatic transmission operates in a predetermined automatic drive range, the method comprising the steps of, detecting a depression of the brake pedal and generating a brake pedal depression indicative signal indicative of said depression of the brake pedal, detecting a present gear position which the automatic transmission is conditioned in and generating a present gear position indicative signal indicative of the present gear position detected, selecting, out of a predetermined group of gear positions which are lower than the present gear position, a new gear position which the automatic transmission should be downshifted to upon presence of the brake pedal depression indicative signal when the automatic transmission operates in the automatic drive range, said selecting step selecting said new gear position in accordance with said present gear position indicative signal and at least one predetermined variable which the automotive vehicle is involved in, the predetermined group of gear positions including a predetermined gear position lower than the another gear position, effecting a downshift from the present gear position in the automatic transmission to said new gear position to condition same in a state for engine brake running at said new gear position when the automatic transmission operates in the automatic drive range, and preventing the automatic transmission from being conditioned for engine brake running at the predetermined gear position upon absence of the depression indicative signal when the automatic transmission operates in the automatic drive range.

According to a further aspect of the present invention, there is provided a method for engine brake running control for an automotive vehicle including a brake pedal, and an automatic transmission, the automatic transmission being shiftable from one gear position down to another adjacent low gear position, the another gear position being determined in accordance with a predetermined schedule when the automatic transmission operates in a predetermined automatic drive range, the method comprising the steps of, detecting a demand for engine brake running of the automotive vehicle when the automatic transmission operates in the predetermined automatic drive range (D range), detecting a present gear position which the automatic transmission is conditioned in, setting one of a first gear position indicator (FDS3) and a second gear position indicator (FDS2) in response to the present gear position detected and the degree of said demand for engine brake running when said demand demand for engine brake running is detected, said first gear position indicator being indicative of the another gear position, said second gear position indicator being indicative cf a predetermined gear position lower than the another gear position; comparing the another gear position that is determined according to the predetermined shift schedule and the gear position indicated by said one gear position indicator that is set and setting as a new gear position a lower one of the another gear position that is determined according to the predetermined schedule and the gear position indicated by said one gear position indicator that is, shifting the automatic transmission from the present gear position down to said new gear position, conditioning the automatic transmission in a state for engine brake running when one of said first and second gear position indicators is set, detecting a release of the brake pedal after said demand for engine brake running has been detected, and resetting said second gear position indicator when said release of the brake pedal is detected. According to still further aspect of the present invention, there is provided a method for engine brake running control for an automotive vehicle including an automatic transmission, an accelerator pedal, and a foot brake, the automatic transmission including an input shaft and an output shaft and being automatically shiftable between a plurality of gear positions in accordance with a predetermined shift schedule when a forward drive range is selected, the method comprising the steps of; detecting whether the drive range is selected or not and generating a drive range selection signal indicative of the fact that the drive range is selected, detecting whether the accelerator pedal is released or not and generating an accelerator pedal release indicative signal indicative of the fact that the accelerator pedal is released, detecting whether the foot brake is depressed or not and generating a foot brake depression indicative signal indicative of the fact that the foot brake is released, detecting a revolution speed of the output shaft of the automatic transmission and generating a revolution speed indicative signal indicative of said revolution speed of the output shaft; generating a deceleration indicative signal indicative of a deceleration which the automotive vehicle is subject to, detecting a present gear position which the automatic transmission is conditioned in and generating a present gear position indicative signal indicative of the present gear position, preparing at least two gear position indicators including a first gear position indicator and a second gear position indicator, said first gear position indicator (FDS2) being indicative of a first gear position and said second gear position indicator (FDS3) being indicative of a second gear position which provides a gear ratio lower than a gear ratio provided by said first gear position; setting one gear position indicator among all for said present gear position and said deceleration indicative signal when said drive range selection signal, said accelerator pedal release indicative signal, and said foot brake depression indicative signal are all present, resetting the first gear position indicator in response to an absence of the foot brake release signal when the drive range selection signal and said accelerator pedal release signals are both present, and conditioning the automatic transmission in one gear position indicated by the gear position indicator which has been set.

BRIEF DESCRIPTION OF THE DRAWINGS

FIG. 4b is a flowchart of a program for determining a deceleration which an automotive vehicle is subject to;

DETAILED DESCRIPTION OF THE INVENTION

Figure 1:
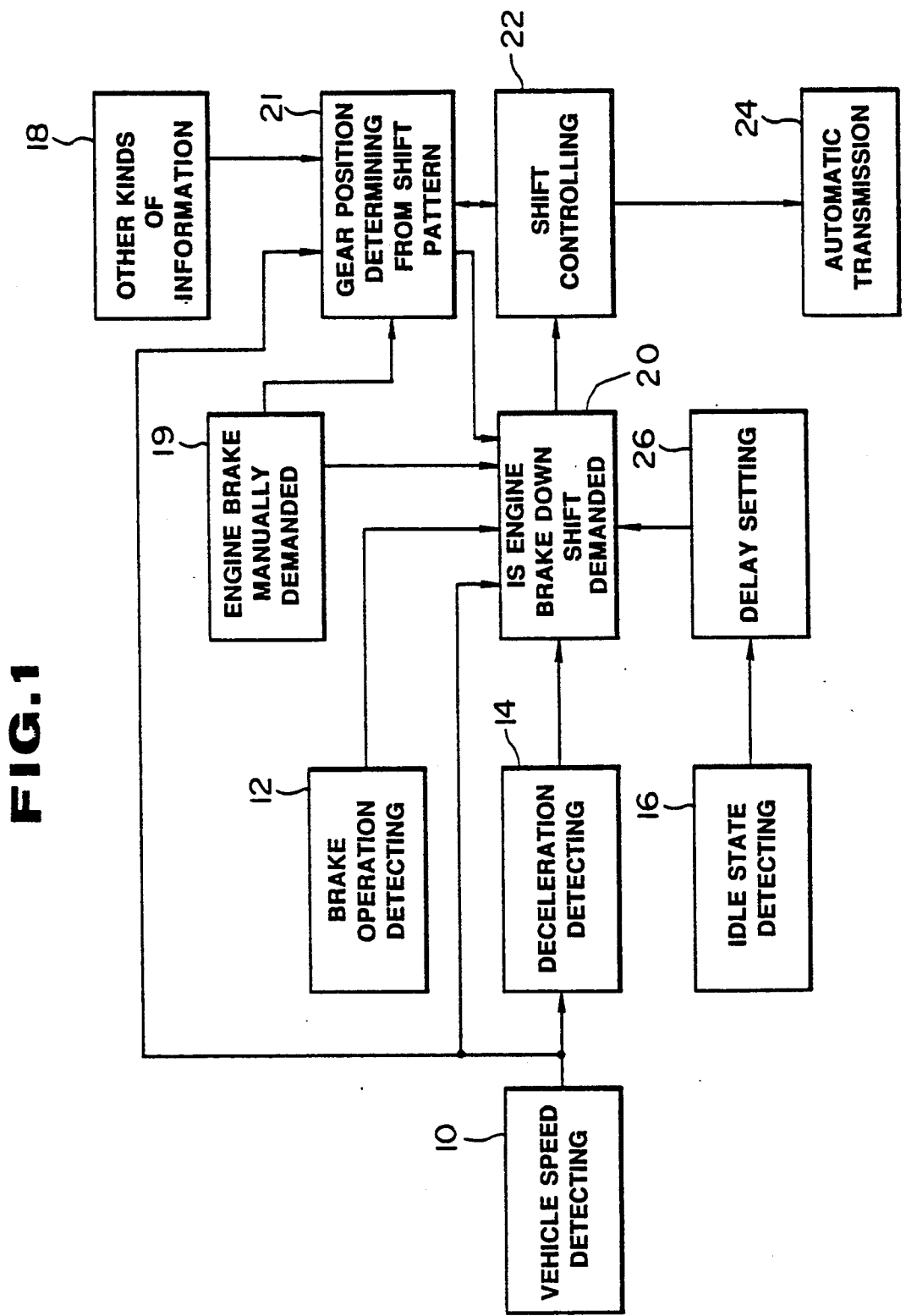
FIG. 1 is a functional block diagram of an embodiment invention.

Referring to FIG. 1, there is shown a functional block diagram of an embodiment of an engine brake running control system according to the present invention. A vehicle speed detecting block 10 where a counter counts the number of pulses generated by a transmission output shaft revolution speed sensor for a predetermined period of time (for example, 100 ms or 354 ms) and generates a vehicle speed indicative signal indicative of the content of the counter. The sensor includes a pulse generator V provided on an output shaft 6 of an automatic transmission 24. A brake operation detecting block 12 is provided where a brake signal generated by a brake switch is detected and it is determined whether the brake is depressed or released. A deceleration detecting block 14 is provided where a time derivative of the vehicle speed indicative signal from the vehicle speed detecting block 10 during a predetermined period of time is calculated and the result is outputted as a deceleration indicative signal. Alternatively, the deceleration which the vehicle is subject to can be directly given by a deceleration sensor mounted to measure the longitudinal deceleration which the vehicle is subject to. An idle state detecting block 16 is provided where an output signal of an idle switch is detected and it is determined whether the engine throttle valve is at the idle speed position or not. The idle switch is arranged within the engine throttle chamber. A block 18 is provided where the other kinds of information, such as a throttle opening degree and an oil temperature of oil used in the automatic transmission, which are necessary for the shifting control are detected and generated as output signals. A block 19 is provided where it is determined whether an engine brake running is demanded or not. More specifically, it is detected at the block 19 whether a selector of a manual valve is placed at a manual "2" range or "1" range position or an overdrive (OD) switch is pressed. When the OD switch is pressed, an upshift to the overdrive fourth gear position is inhibited. The output signal of the block 19 is fed to a block 20.

The block 20 is provided for determining whether there is any demand for engine brake downshift and a new gear position which the automatic transmission should be shifted down to. Fed to this block 20 are the vehicle speed indicative signal from the block 10, the brake operation indicative signal from the block 12, the idle operation indicative signal from a block 26 accompanied by a delay, and the output signal from the block 19. At the block 20, it is determined whether predetermined conditions are met for effecting downshifting for an engine brake running or not and a new gear position is determined which the automatic transmission should be shifted down to. The output of the block 20 indicative of the result is fed to a shift controlling block 22.

The outputs of the blocks 10, 18 and 19 are fed to a block 21 where a desired gear position which the automatic transmission should be conditioned in is determined by table look-up operation of a shift pattern table in a conventional manner. For example, an appropriate shift pattern table for engine brake running is selected and set for use when the output of the block 19 indicates that the selector is placed at the manual "2" or "1" range position. An output of the block 21 indicative of the desired gear position is fed to the shift controlling block 22.

The shift controlling block 22 controls shifting in gear position in the automatic transmission 24 in a conventional manner in the absence of the output signal from the block 20 indicative of the fact that the predetermined conditions for effecting downshifting for engine brake running are met. However, upon receipt of the output signal from the block 20 indicative of the fact that the predetermined conditions for effecting downshifting for engine brake running are met, the shift controlling block 22 commands downshifting and engaging of a clutch for effecting engine brake running, namely an overrunning clutch in the case of the automatic transmission used herein.

In this embodiment, the automatic transmission 24 is of the RE4R01A type described in "NISSAN FULL-RANGE AUTOMATIC TRANSMISSION RE4R-01A TYPE, SERVICE MANUAL, (A261C07)" issued on March, 1987 by NISSAN MOTOR COMPANY LIMITED. The automatic transmission of the above mentioned type is also disclosed in the before mentioned U.S. Pat. No. 4,680,992 (Hayasaki et al.) which is hereby incorporated in its entirety by reference.

Referring to FIGS. 2A, 2B, 2C, and 3, the automatic transmission 24 is briefly described.

Figure 2A:
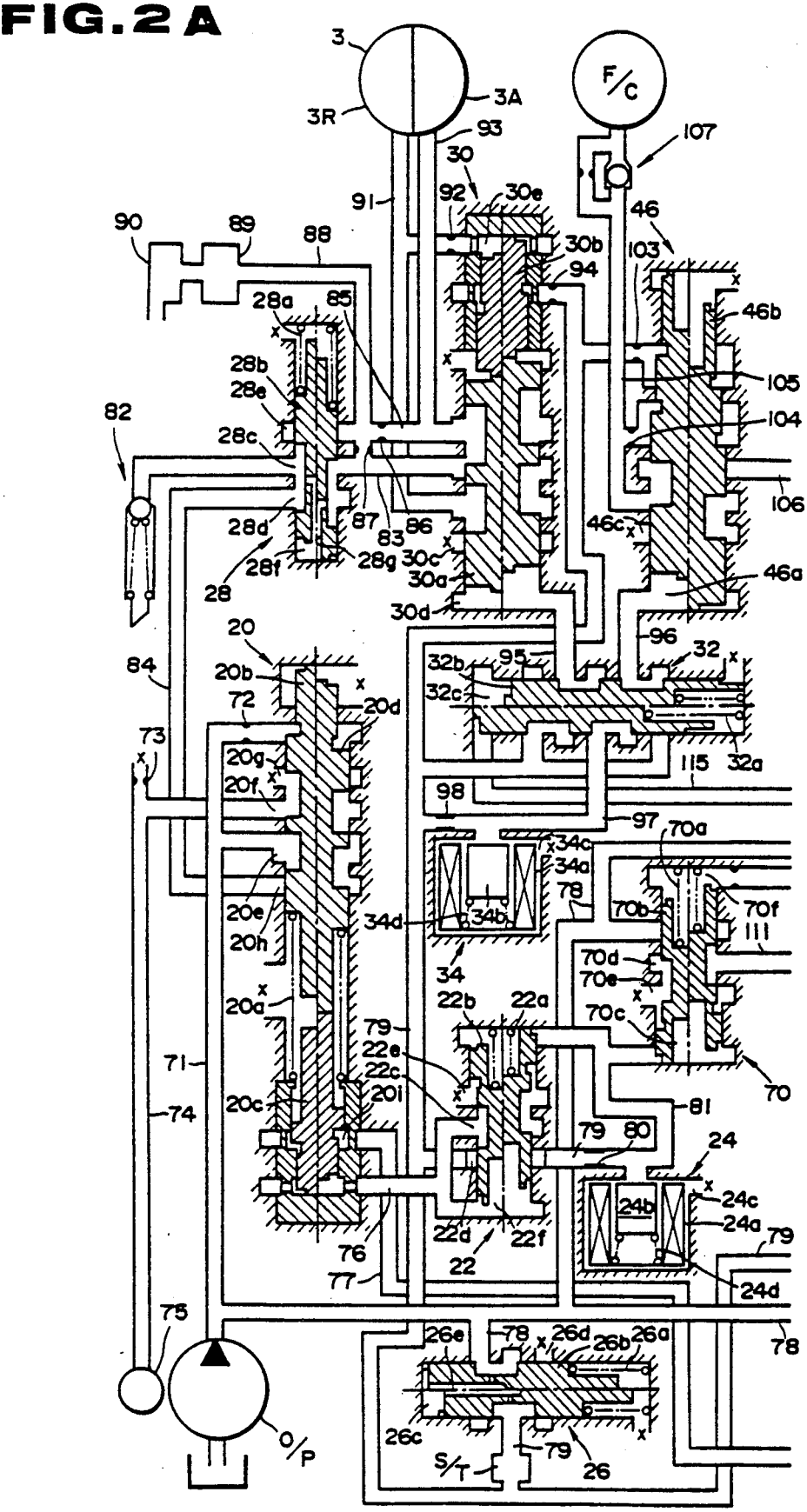
FIGS. 2A, 2B, and 2C when combined side by side, illustrate an electro-hydraulic control system for the automatic transmission shown in FIG. 1.
Figure 2B:
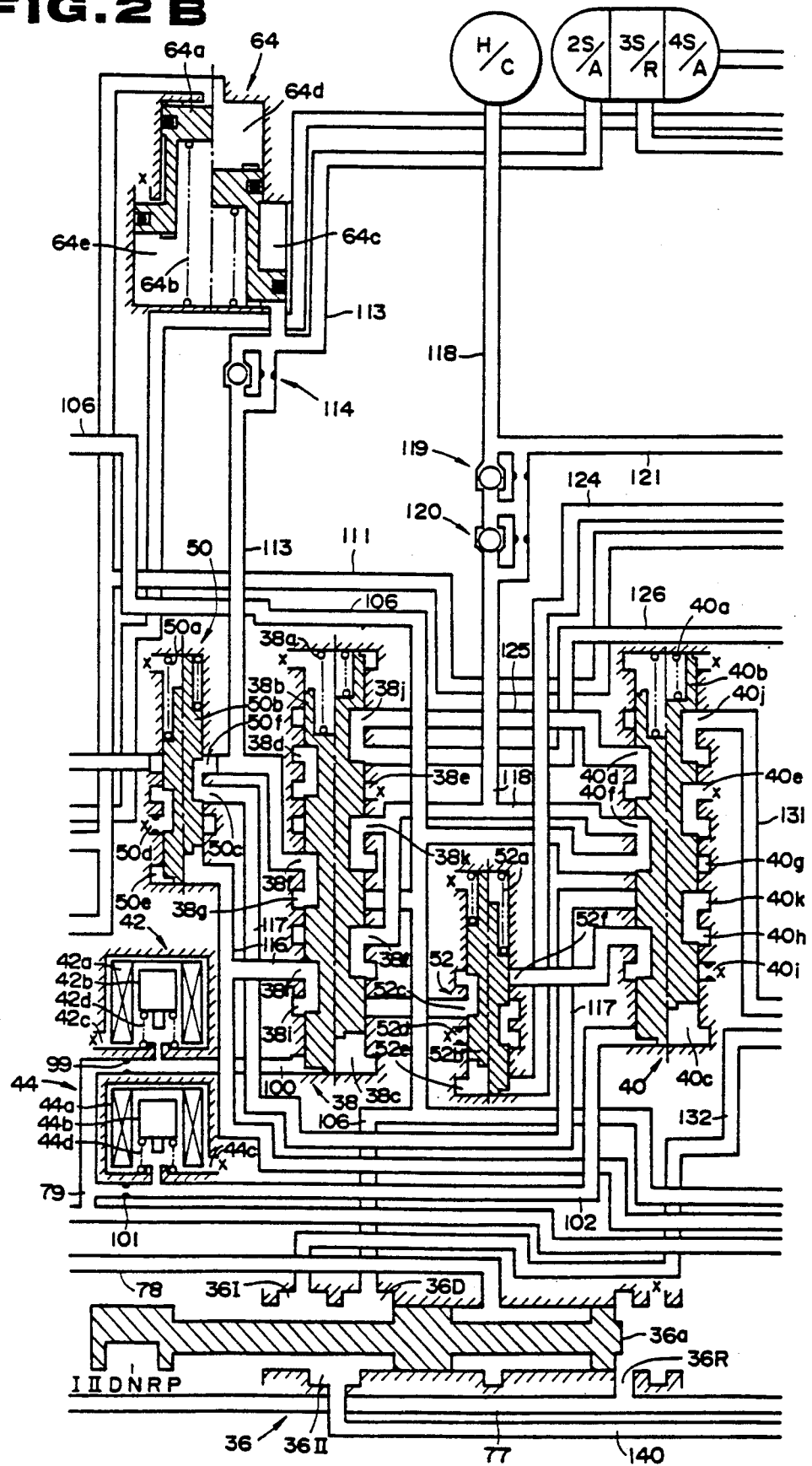
Figure 2C:
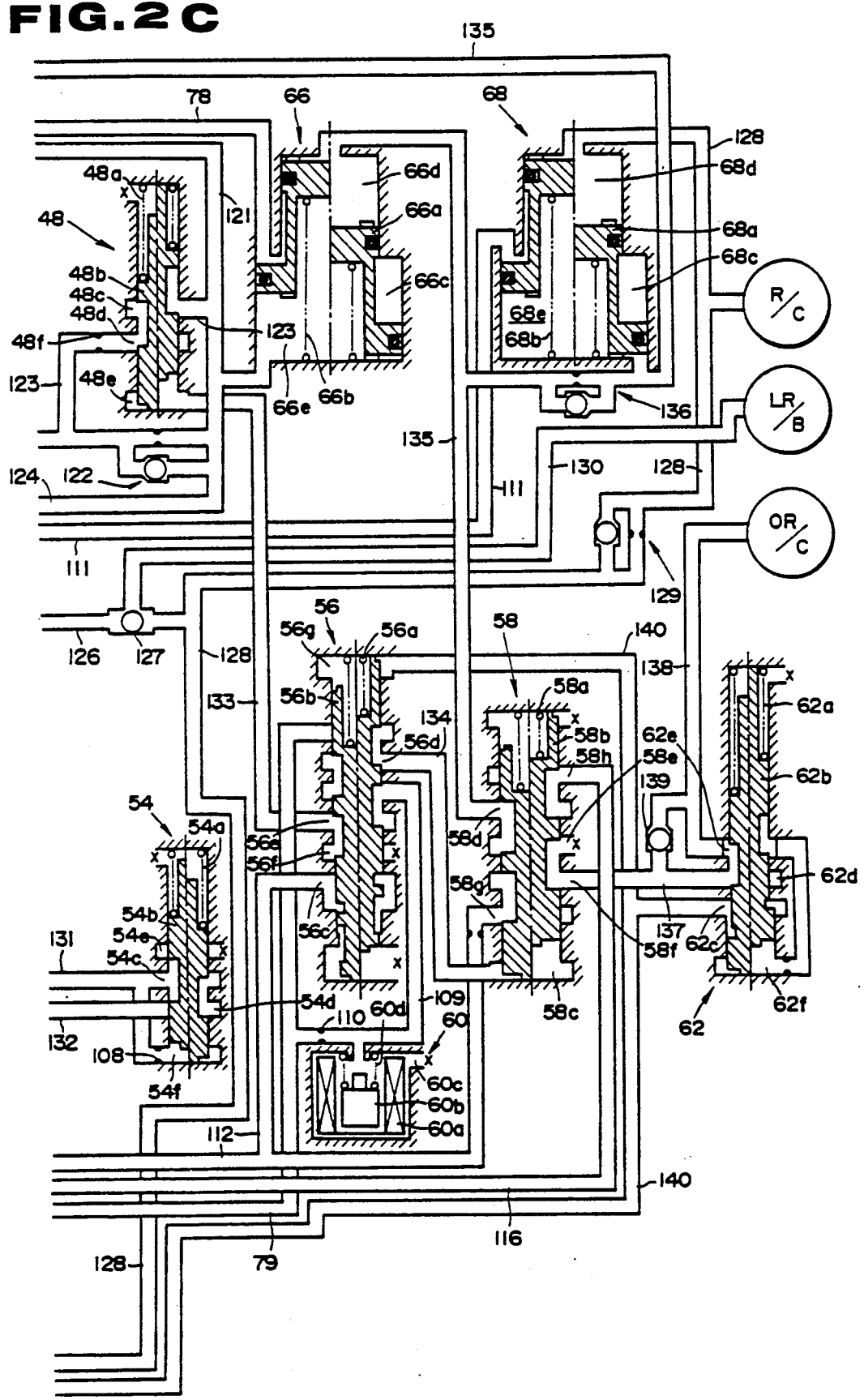
Figure 3:
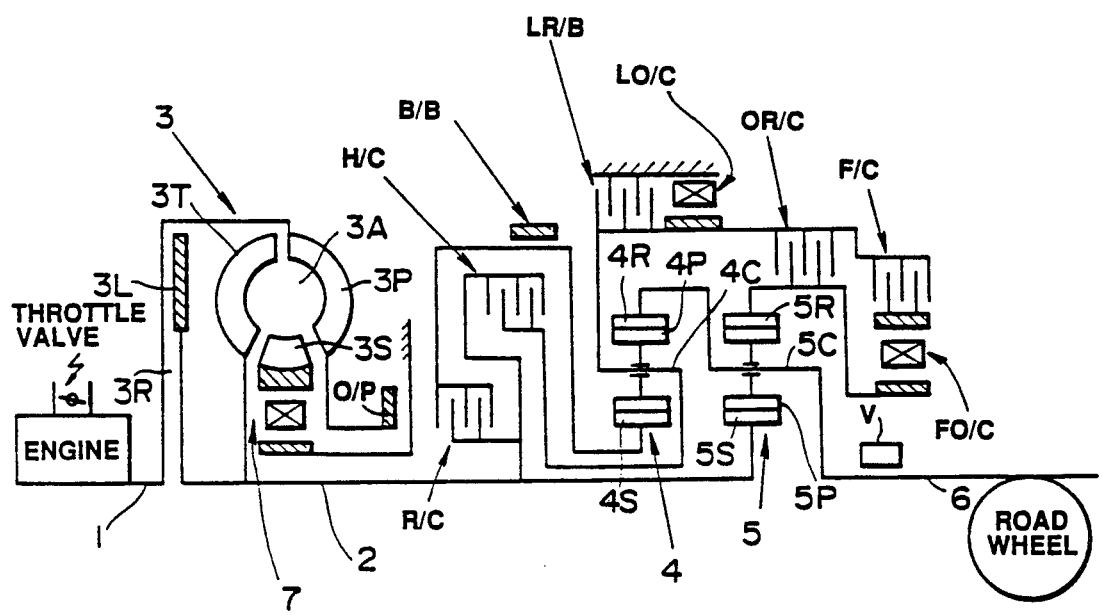
FIG. 3 is a schematic view showing the gear train of the automatic transmission in association with an internal combustion engine and a road wheel shown in block diagram.

FIG. 3 shows a schematic diagram of a gear train for the automatic transmission 24, and FIGS. 2A, 2B, and 2C when combined illustrate a hydraulic circuit of a control valve assembly for the automatic transmission 24. The detailed description along with these Figures is hereby omitted because the same is found in U.S. Pat.

No. 4,680,992 issued to Hayasaki et al. on July 21, 1987, which has been hereby incorporated by reference in its entirety. Particular attention should be paid to the descriptive parts in connection with FIGS. 1A, 1B, and 1C and 2 of this U.S. Pat. No.

Briefly, in FIG. 3, the overrunning clutch mentioned before is denoted by the reference character OR/C.

Referring to FIGS. 2A, 2B, and 2C, an overrunning clutch solenoid 60, a shuttle valve 56, an overrunning clutch control valve 58, and an overrunning clutch reducing valve 62 perform an engine brake control where the overrunning clutch OR/C is engaged. The overrunning clutch solenoid 60, the shuttle valve 56, and a 3-2 timing valve 48 perform a 3-2 timing control. Further, two shift solenoids 42 and 44 and two shift valves 38 and 40 perform an automatic shift control among first, second, third and fourth (overdrive) gear positions. By setting the energization and/or de-energization of the shift solenoids 42 and 44, the transmission may be conditioned in any desired gear position. For further information relating to this control, reference should be made to co-pending U.S. patent application of Yasushi NARITA Ser. No. 07/301,352 filed on Jan. 25, 1989 and assigned to the same assignee which the present application is to be assigned.

Hereinafter, the flowcharts of control programs stored in a memory, such as a read only memory (ROM), of a control unit are described in association with the functional diagram shown in FIG. 1.

Figure 4A:
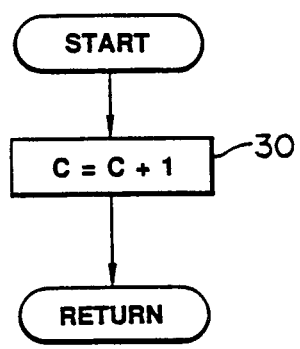
FIG. 4a is a flowchart of a program for counting a pulse generated by a vehicle speed sensor for detecting a revolution speed of a transmission output shaft.
Figure 4B:
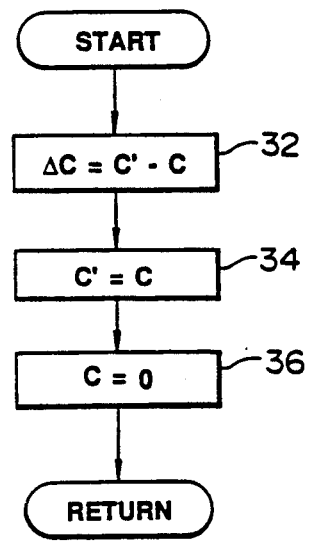

Referring to FIGS. 4a and 4b, the vehicle speed detecting block 10 and the deceleration detecting block 14 are further described. This block has a counter C which counts the number of pulses from the transmission output shaft revolution speed sensor. The execution of a program as shown by the flowchart in FIG. 4a is initiated by interruption occurring in synchronous with the occurrence of pulse signal from the transmission output shaft revolution speed sensor. At a step 30, the content of the counter is increased by one. The execution of a program as illustrated in a flowchart in FIG. 4b is initiated upon expiration of a predetermined period of time for example 100 ms or 354 ms. At a step 32, a difference $\Delta C$ (delta C) is calculated by subtracting C from C', where C represents the present content of the counter, while C' the previous content of the counter given the predetermined period of time ago. At a step 34, C' is updated and set equal to C. Then, at a step 36, C is cleared and set equal to 0 (zero). It will be noted that the content of the counter C is indicative of a vehicle speed (VSP) which the vehicle is running at. The difference $\Delta C$ (delta C) reveals a positive value when the vehicle is subject to a deceleration ($\alpha$, alpha) and is proportional to the magnitude of the deceleration alpha. Of course, the deceleration may be determined by directly detecting the deceleration by a vehicle mount deceleration sensor (or an accelerenometer).

Figure 5:
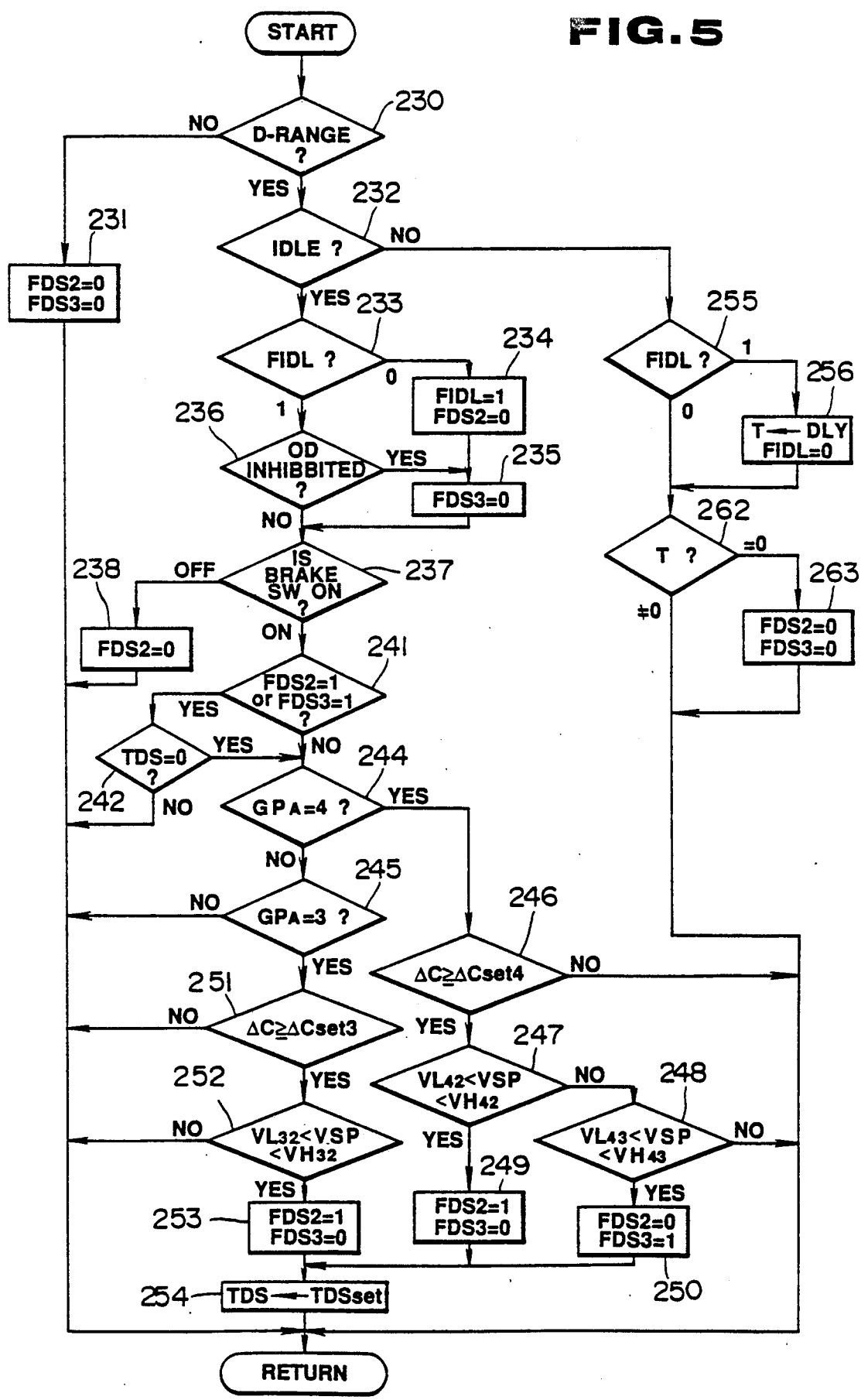
FIG. 5 is a flowchart of a program for conducting engine brake running control.

Referring to the flowchart shown in FIG. 5, the function assigned to the block 20 is described.

In FIG. 5, at a step 230 it is determined whether the manual valve is placed at the "D" range position (viz., the automatic drive range position) or not. If an answer to this inquiry is NO, the program proceeds to a step 231 where the flags FDS2 and FDS3 are reset to 0 and ends since the automatic engine brake running is not required when the manual valve, is placed at the "II" or "I" range position. The downshift flag FDS2 indicates an instruction to effect an engine brake running at the second gear position when it is set equal to 1, while the other downshift flag FDS3 an instruction to effect an engine brake running at the third gear position. The downshift flag FDS2 also serves as a flag to inhibit upshift to the third gear position upward, while the downshift flag FDS3 a flag to inhibit upshift to the fourth speed.

If the inquiry at step 230 is YES, the program proceeds to a step 232 where it is determined whether the accelerator pedal is released or not, viz., whether the idle state indicative switch is ON or not. If the "D" range is selected and the accelerator pedal is released, the program proceeds from the step 232 to a step 233 where it is determined whether an idle flag FIDL has been set equal to 1 or not. If the idle flag FIDL is not equal to 1, the program proceeds to a step 234 where the idle flag FIDL is set equal to 1 and the downshift flag FDS2 is rest to 0 (zero). Then, it proceeds to a step 235 where the downshift flag FDS3 is reset to 0 (zero). If it is determined at the step 233 that the idle flag FIDL is equal to 1, the program proceeds to a step 236 where it is determined whether the overdrive inhibitor button (OD) is pressed by the driver or not. When the overdrive inhibitor button (OD) is pressed, the automatic transmission is inhibited from operating at the fourth gear position (overdrive). If the overdrive is inhibited, the program proceeds to the step 235 where the downshift flag FDS3 is reset to 0 (zero) to cancel the instruction to effect engine brake running at the third gear position.

At the subsequent step 237, it is determined whether the brake pedal is depressed or not (viz., whether the brake switch designed to be turned ON in response to depression of the brake pedal is ON or not). If the brake pedal is released and thus not depressed, indicating that substantially great engine brake effect is not required, the program proceeds to step 238 where the downshift flag FDS2 is reset to 0 (zero) and ends. Accordingly, the instruction to effect engine brake running at the second gear position which has been set is cancelled immediately after the brake pedal is released.

If the brake pedal is depressed, indicating that the substantially great engine brake effect is required, program proceeds to step 241 where it is determined whether at least one of the downshift flags FDS2 and FED3 is set equal to 1 or not. If at least one of the downshift flags FDS2 and FDS3 is equal to 1, indicating that the automatic transmission is conditioned for engine brake running, . the program proceeds, to a step 242 where a downshift timer TDS is checked. If TDS does not reduce down to zero yet, the program ends and the present states of the downshift flags FDS2 and FDS3 are maintained. The states of the downshift flags FDS2 and FDS3 are updated whenever the content of the downshift timer TDS becomes 0 (zero). The timer TDS is set equal to $TDS_{set}$ at a step 254 later mentioned and the decrement is conducted at a predetermined interval (for example, 10 msec) by executing a program shown in FIG. 6. If, as a result of checking operation at the step 241, it is confirmed that the downshift flag FDS2 is 0 (zero) and the downshift flag FDS3 is 0 (zero), the states of these downshift flags FDS2 and FDS3 are updated immediately regardless of the content of the downshift timer TDS.

The manner of updating the states of the downshift flags FDS2 and FDS3 is hereinafter explained. At steps 244 and 245, it is determined whether the present gear position $GP_A$ is equal to the fourth gear position or the third gear position or not. If the present gear position GP$_A$ is the fourth gear position, the program proceeds from the step 244 to a step 246. At the step 246, it is determined whether ΔC (delta C) indicative of the magnitude of deceleration is greater than or equal to a predetermined deceleration value ΔC$_{set4}$ or not. If, as a result of the inquiry at the step 246, ΔC > ΔC$_{set4}$, the program proceeds to a step 247 where it is determined whether the vehicle speed VSP falls in a predetermined vehicle speed range defined by a lower limit vehicle speed value VL$_{42}$ and an upper limit vehicle speed value VH$_{42}$ (VL$_{42}$ < VSP < VH$_{42}$) or not. If the VSP falls outside of this vehicle speed range and thus the answer to the inquiry at the step 247 is NO, the program proceeds to a step 248. At the step 248, it is determined whether VSP falls in another predetermined vehicle speed range defined by a lower limit vehicle speed value VL$_{43}$ and an upper limit vehicle speed value VH$_{43}$ (VL$_{43}$ < VSP < VH$_{43}$) or not. If the answer to the inquiry at the step 247 is YES (viz., VL$_{42}$ < VSP < VH$_{42}$), the program proceeds to a step 249 where the downshift flag FDS2 is set equal to 1 and the other downshift flag FDS3 is reset to 0 (zero). If the answer to the inquiry at the step 248 is YES (viz., VL$_{43}$ < VSP < VH$_{43}$), the program proceeds to a step 250 where the downshift flag FDS2 is reset to 0 (zero) and the other downshift flag FDS3 is set to 1. If the answer to the inquiry at the step 246 or 248 is NO. the program ends. If it is determined at the step 245 that the present gear position GP$_A$ is equal to the third gear position, the program proceeds to a step 251 where it is determined whether ΔC (delta C) is greater than or equal to a predetermined deceleration value ΔC$_{set3}$ or not. If the answer to the inquiry at the step 251 is YES, the program proceeds to a step 252 where it is determined whether the vehicle speed VSP falls in a predetermined vehicle speed range defined by a lower limit vehicle speed value VL$_{32}$ and an upper limit vehicle speed value V$_{32}$ or not. If the VSP falls in this predetermined vehicle speed range, the program proceeds to a step 253 where the downshift flag FDS2 is set to 1 and the other downshift flag FDS2 is reset to 0 (zero). After the step 249 or 250 or 253, the downshift timer TDS is set equal to TDS$_{set}$ at the step 254.

Referring back to step 232, it is determined at this step whether the flag FIDL is set to 1 or 0. If FIDL=1 indicating that there is a shift from idle ON status to idle OFF status, the program proceeds to a step 256 where the timer T is set equal to a predetermined delay value DLY, and the flag FIDL is reset to 0 and the program proceeds to a step 262. If the flag FIDL is 0 at step 255, the program proceeds directly to the step 262. At step 262, it is determined whether the timer T is 0 or not. If the timer T is not 0, the program ends. If the timer T is 0, the program proceeds to a step 263 where the downshift flags FDS2 and FDS3 are reset to 0.

Figure 6:
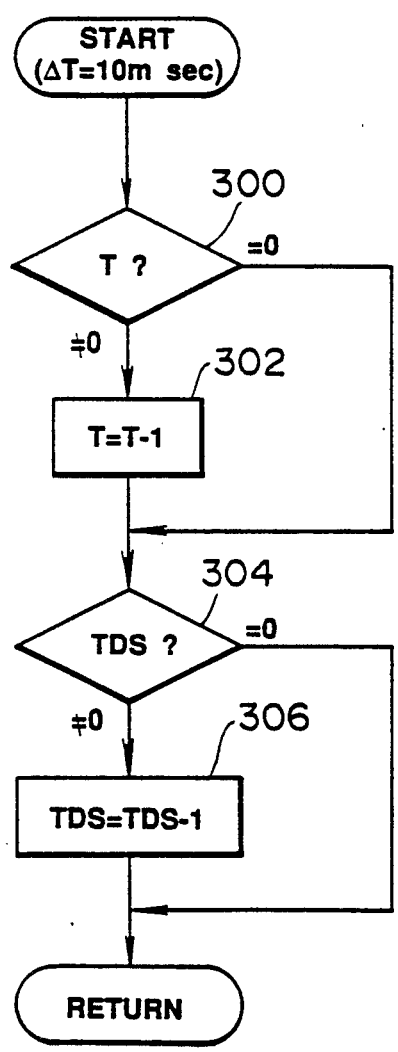
FIG. 6 is a flowchart of a program for conducting decrements of downshift timer (TDS) and delay timer (T)

The decrements of the downshift timer TDS and delay timer T are conducted by executing a sub-program shown in FIG. 6 which is executed upon elapse of a predetermined period of time, for example 10 ms. In FIG. 6, at a step 300 it is determined whether the content of the delay timer T is 0 (zero) or not. If it is determined that the content of the delay timer T is not yet 0 (zero, the program proceeds to a step 302 where the content of timer T is decreased by 1 (decrement of the delay timer T), then the program proceeds to steps 304 and 306 where decrement of the downshift timer TDS is conducted.

Figure 7:
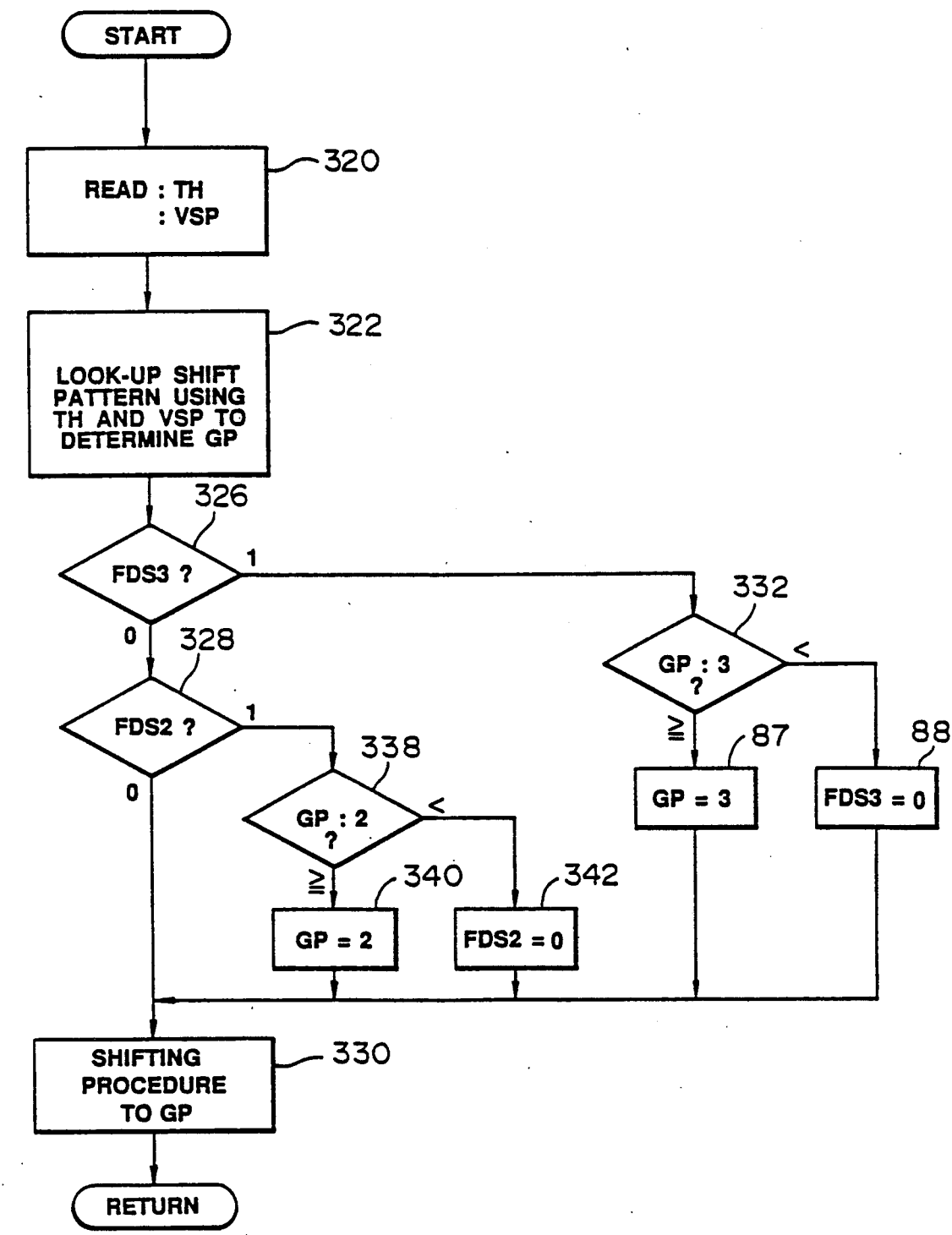
FIG. 7 is a flowchart of a program for determining a new gear position which the automatic transmission should be conditioned in after comparing a gear position obtained by retrieving a predetermined shift pattern provided for the automatic drive range with a new gear position determined by the flowchart shown in FIGS. 5A and 5B.
Figure 8:
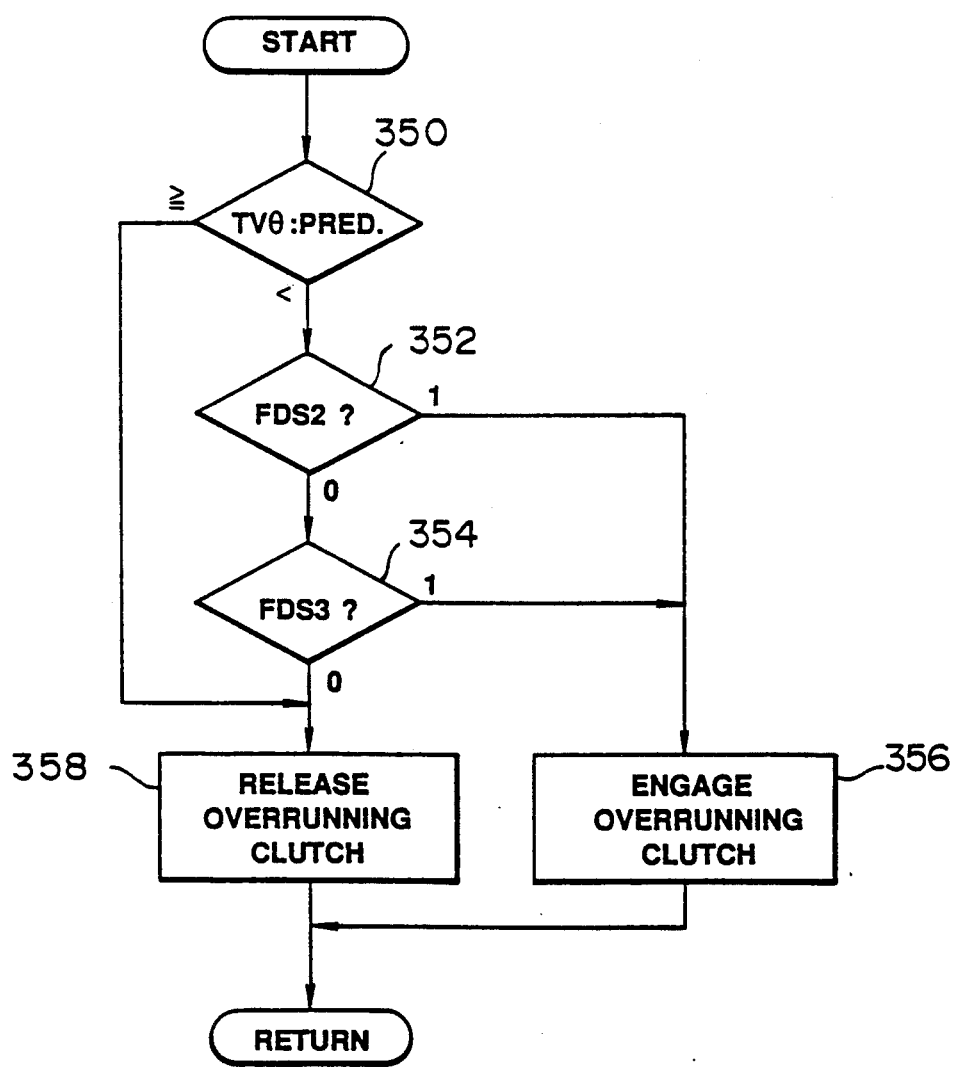
FIG. 8 is a flowchart of a program for controlling engagement of an overrunning clutch which when engaged conditions the automatic transmission for engine brake running.

Referring to FIGS. 7 and 8, the functions assigned to the blocks 21 and 22 are described.

In FIG. 7, reading operation is performed at step 320 to store TH (throttle opening degree) and VSP (vehicle speed) as operating condition indicative variables. At step 322, using TH and VSP stored, an appropriate shift pattern table is selected and a table look-up of the shift pattern table selected is conducted to determine a desired gear position GP. At steps 326 and 328, it is checked whether there occurs no engine brake running state (FDS3=0, FDS=2) or engine brake running state at the third gear position (FDS3=1) or engine brake running state at the second gear position (FDS2=1). If there occurs no automatic engine brake running state, the program proceeds to a step 330 where usual shifting procedure to bring the actual gear position into agreement with the desired gear position GP is conducted.

If there occurs engine brake running state at the third gear position, the program proceeds from the step 326 to a step 332 where it is checked whether GP is greater than or equal to 3 (third gear position) or not. If GP is greater than or equal to 3, GP is set equal to 3 at a step 334. If GP is less than 3, the program proceeds to a step 336 where the downshift flag FDS3 is reset to 0 (zero) and then proceeds to the step 330.

If there occurs engine brake running state at the second gear position, the program proceeds from the step 328 to a step 338 where it is checked whether GP is greater than or equal to 2 or not. If GP is greater than or equal to 2, GP is set equal to 2 at a step 340. If GP is less than 2, the program proceeds to a step 342 where the downshift flag FDS2 is reset to 0 (zero) and then proceeds to the step 330.

Referring to FIG. 8, at step 350, the throttle valve opening TH is compared with a predetermined value. If TH is greater than or equal to the predetermined value, the program proceeds to a step 358 where the overrunning clutch OR/C is released. If TH is less than the predetermined value, the program proceeds to a step 352 where it is determined whether the downshift flag FDS2 is set or not. If this flag FDS2 is set, where the overrunning clutch OR/C is engaged at a step 356, inducing engine brake running state. If the downshift flag FDS3 is set, the overrunning clutch is engaged at the step 356, inducing engine brake running state. From this description, it will be understood that the overrunning clutch OR/C is engaged whenever least one of the downshift flags FDS2 and FDS3 is set equal to 1. If both of them are reset to 0 (zero), the engine brake running state is released.

Figure 9:
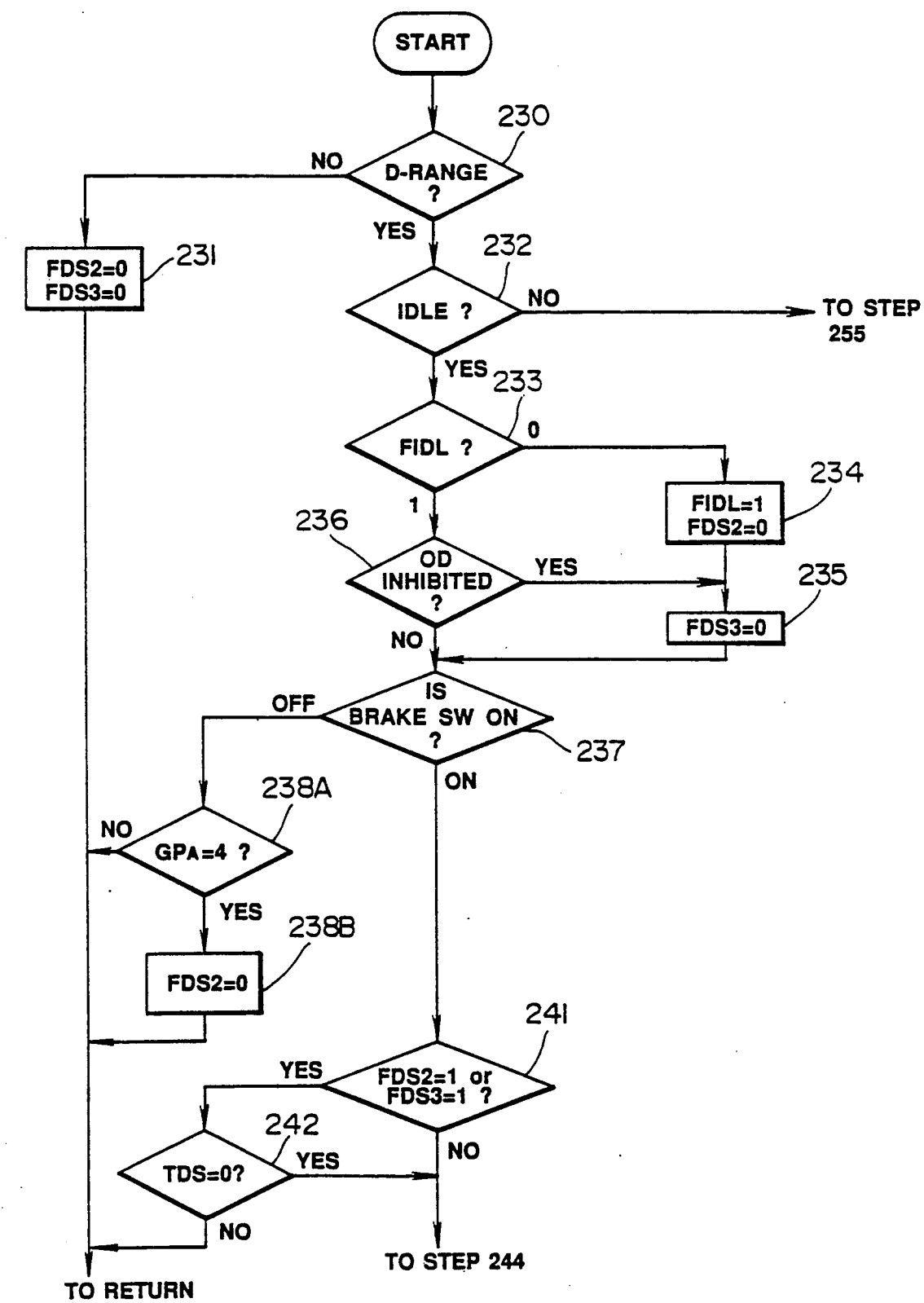
FIG. 9 is a portion of a flowchart similar to FIG. 5 showing an alternative modification.

Referring to FIG. 9 the second embodiment of the present invention is described. This embodiment is substantially the same as the first embodiment previously described except that a downshift flag FDS2 is reset to 0 (zero) at a step 238B when it is determined at a step 238A that the present gear position GP$_A$ is the fourth gear position after it is determined at a step 237 that the brake pedal has been released. Briefly, the step 238 in the flowchart shown in FIG. 5 has been replaced with the above-mentioned two steps 238A and 238B.

With this modified flowchart as shown in FIG. 9, the automatic transmission is prevented from effecting a 4-2 downshift for engine brake running at the second gear position when it is determined at the step 237 that the brake pedal has been released. However, a 3-2 downshift for engine brake running at the second gear position and a 4-3 downshift for engine brake running at the third gear position are not prevented.

Figure 10:
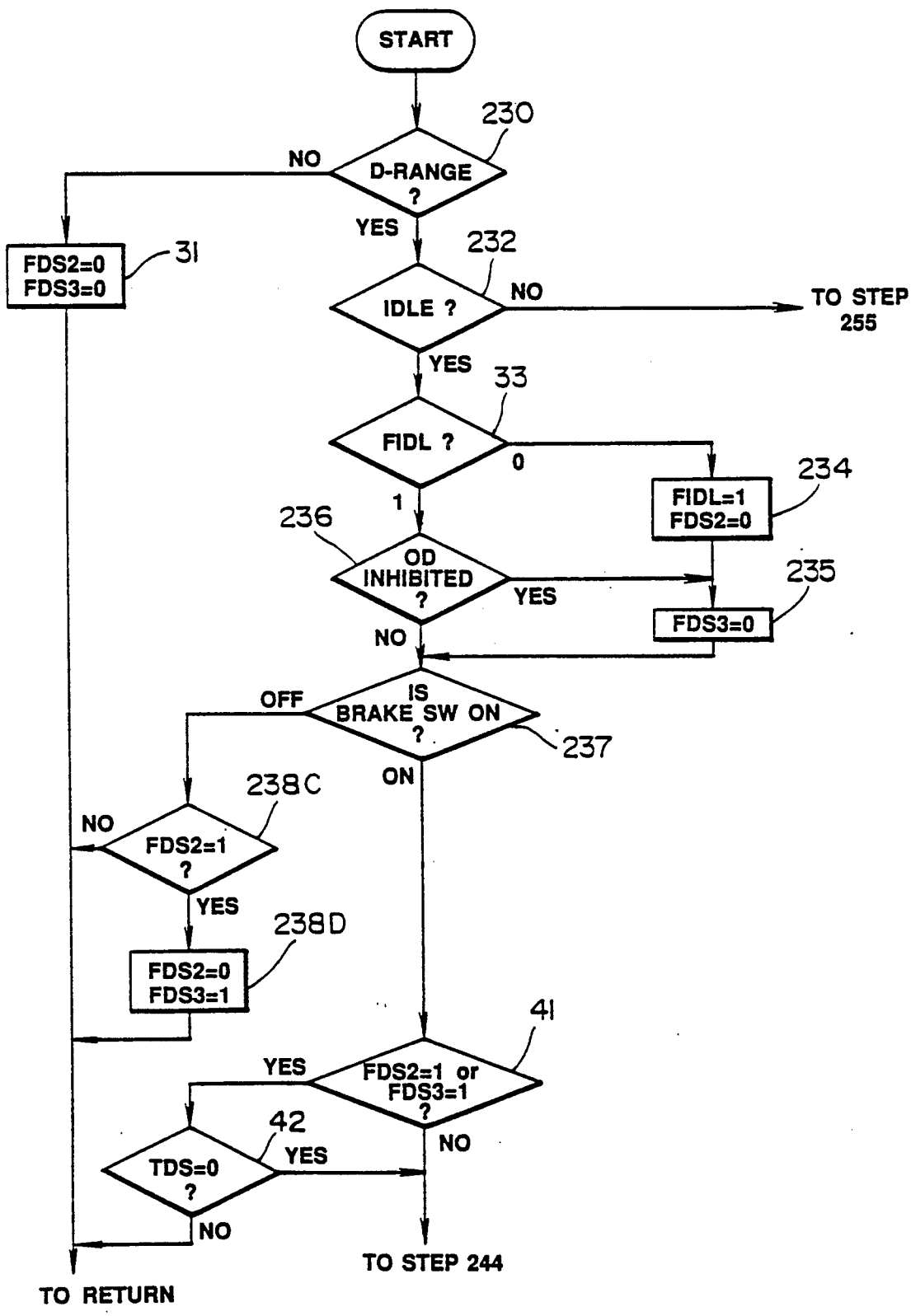
FIG. 10 is a portion of a flowchart similar to FIG. 5 showing still another alternative modification.

Referring to FIG. 10, the third embodiment of the present invention is described. This embodiment is substantially the same as the first embodiment except that a downshift flag FDS2 is reset to 0 (zero) and the other downshift flag FDS3 is set to 1 at a step 238D when it is determined at a step 238C that the downshift flag FDS2 is set to 1 after it is determined at a step 237 that the brake pedal has been released. Briefly, the step 238 in the flowchart shown in FIG. 5 has been replaced with the above-mentioned two steps 238C and 238D. With this modification, the engine running at the second gear position which has been originally set is replaced with the engine brake running at the third gear position after the brake pedal has been released.

What is claimed is:

1. An engine brake running control system for an automotive vehicle including a brake pedal, and an automatic transmission, the automatic transmission being shiftable to a predetermined gear position when the automatic transmission operates in a predetermined automatic drive range, the engine brake running control system comprising:

means for detecting a depression of the brake pedal and generating a brake pedal depression indicative signal indicative of said depression of the brake pedal;

means for detecting a present gear position which the automatic transmission is conditioned in and generating a present gear position indicative signal indicative of said present gear position detected;

means for selecting, out of a predetermined group of gear positions including the predetermined gear position, a new gear position lower than said present gear position in accordance with said preset gear position indicative signal and at least one variable which the automotive vehicle is involved in as long said brake pedal depression indicative signal is generated when the automatic transmission operates in the predetermined automatic drive range;

means for effecting a downshaft from said present gear position in the automatic transmission to said new gear position when the automatic transmission operates in the predetermined automatic drive range;

means for conditioning the automatic transmission for engine brake running at said new gear position as long as said brake pedal depression indicative signal is generated when the automatic transmission operates in the predetermined automatic drive range; and means for preventing said conditioning means from conditioning the automatic transmission for engine brake running at the predetermined gear position when said brake pedal depression indicative signal disappears subsequently when the automatic transmission operates in the predetermined automatic drive range, wherein said selecting means include a first indicator indicative of a gear position higher than and.

2. An engine brake running control system as claimed in claim 1, wherein said conditioning means are operative to condition the automatic transmission for engine brake running when one of said first and second indicators is set.

3. An engine brake running control system as claimed in claim 2, wherein said conditioning means are operative to condition the automatic transmission for engine brake running at that gear position which is indicated by that one of said first and second indicators which is set.

4. An engine brake running control system as claimed in claim 3, wherein said preventing means are operative to reset said second indicator.

5. An engine brake running control system as claimed in claim 3, wherein said preventing means are operative to reset said second indicator when said present gear position indicative signal is indicative of a gear position higher than and next adjacent to a gear position that is higher than and next adjacent to the predetermined gear position.

6. An engine brake running control system as claimed in claim 3, wherein said preventing means are operative to reset said second indicator and set said first indicator after said second indicator has been set.

7. An engine brake running control system for an automotive vehicle including a brake pedal, and an automatic transmission, the automatic transmission being shiftable to a predetermined gear position when the automatic transmission operates in a predetermined automatic drive range, the engine brake running control system comprising:

means for detecting a depression of the brake pedal and generating a brake pedal depression indicative signal indicative of said depression of the brake pedal;

means for detecting a present gear position which the automatic transmission is conditioned in and generating a present gear position indicative signal indicative of said present gear position detected;

means for selecting, out of a predetermined group of gear positions including the predetermined gear position, a new gear position lower than said present gear position in accordance with said preset gear position indicative signal and at least one variable which the automotive vehicle is involved in as long as said brake pedal depression indicative signal is generated when the automatic transmission operates in the predetermined automatic drive range;

means for effecting a downshift from said present gear position in the automatic transmission to said new gear position when the automatic transmission operates in the predetermined automatic drive range;

means for conditioning the automatic transmission for engine brake running at said new gear position as long as said brake pedal depression indicative signal is generated when the automatic transmission operates in the predetermined automatic drive range; and means for preventing said conditioning means from conditioning the automatic transmission for engine brake running at the predetermined gear position when said present gear position indicative signal is indicative of a gear position higher than and.

8. An engine brake running control system for an automotive vehicle including a brake pedal, and an automatic transmission, the automatic transmission being shiftable to a predetermined gear position when the automatic transmission operates in a predetermined automatic drive range, the engine brake running control system comprising:

means for detecting a depression of the brake pedal and generating a brake pedal depression indicative signal indicative of said depression of the brake pedal;

means for detecting a present gear position which the automatic transmission is conditioned in and generating a present gear position indicative signal indicative of said present gear position detected;

means for selecting, out of a predetermined group of gear positions including the predetermined gear position, a new gear position lower than said present gear position in accordance with said preset gear position indicative signal and at least one variable which the automotive vehicle is involved in as long as said brake pedal depression indicative signal is generated when the automatic transmission operates in the predetermined automatic drive range;

means for effecting a downshift from said present gear position in the automatic transmission to said new gear position when the automatic transmission operates in the predetermined automatic drive range;

means for conditioning the automatic transmission for engine brake running at said new gear position as long as said brake pedal depression indicative signal is generated when the automatic transmission operates in the predetermined automatic drive range; and means for preventing said conditioning means from conditioning the automatic transmission for engine brake running at the predetermined gear position, but allowing said conditioning means to condition the automatic transmission for engine brake running at a gear position higher than and adjacent to the predetermined gear position.

9. An engine brake running control system for an automotive vehicle including a brake pedal, and an automatic transmission, the automatic transmission being shiftable to a predetermined gear position in accordance with a predetermined shift schedule when the automatic transmission operates in a predetermined automatic drive range, the engine brake running control system comprising:

means for detecting a demand for engine brake running of the automotive vehicle when the automatic transmission operates in the predetermined automatic drive range;

means for detecting a present gear position which the automatic transmission is conditioned in;

means for setting one of a first indicator and a second indicator in response to said present gear position detected and said demand for engine brake running detected;

said first indicator being indicative of a gear position higher than and next adjacent to the predetermined gear position, said second indicator being indicative of the predetermined gear position;

means for comparing a gear position that is determined in accordance with the predetermined shift schedule with that gear position which is indicated by said one of said first or second indicators that is set and setting as a new gear position a lower one of said gear position that is determined in accordance with the predetermined shift schedule and said gear position which is indicated by said one indicator that is set;

means for shifting the automatic transmission from said present gear position down to said new gear position;

means for conditioning the automatic transmission for engine brake running when one of said first and second indicators is set;

means for detecting a release of the brake pedal after said demand for engine brake running has been detected; and means for resetting said second indicator when said release of the brake pedal is detected.

10. An engine brake running control system as claimed in claim 9, wherein said resetting means include means for resetting said second indicator when said present gear position detected is higher than and adjacent to a gear position that is higher than and adjacent to the predetermined gear position.

11. An engine brake running control system as claimed in claim 9, wherein said resetting means include means for resetting said second indicator and setting said first indicator after said second indicator has been set.

12. An engine brake running control system as claimed in claim 9, including means for detecting a deceleration which the automotive vehicle is subject to, the deceleration detected being used and indicative of the degree of said demand for engine brake running.

13. An engine brake running control system as claimed in claim 12, wherein said deceleration detecting means include means for detecting a velocity of an output shaft of the automatic transmission.

14. In an automotive vehicle including a brake pedal, and an automatic transmission having a predetermined gear position:

means for detecting a depression of the brake pedal and generating a brake pedal depression indicative signal indicative of said depression of the brake pedal;

means for determining a deceleration which the automotive vehicle is subject to and generating a deceleration indicative signal indicative of said deceleration determined;

means for detecting a present gear position which the automatic transmission is conditioned in and generating a present gear position indicative signal indicative of the present gear position detected;

means for determining a first new gear position in accordance with a predetermined shift schedule when the automatic transmission operates in a predetermined automatic drive range;

means for selecting, out of a predetermined group of gear positions including the predetermined gear position, a second new gear position lower than said present gear position in accordance with said present gear position indicative signal and said deceleration indicative signal as long as said brake pedal depression indicative signal is generated when the automatic transmission operates in said predetermined automatic drive range;

means for comparing a parameter of the first new gear position with a parameter of the second new gear position and setting as a target gear position a lower one of said first new gear position and said second new gear position;

means for effecting a downshift from said present gear position in the automatic transmission to said target gear position when the automatic transmission operates in said predetermined automatic drive range;

means for conditioning the automatic transmission for engine brake running at said target gear position as long as said brake pedal depression indicative signal is generated when the automatic transmission operates in said predetermined automatic drive range; and means for preventing said conditioning means from conditioning the automatic transmission for engine brake running at the predetermined gear position when said brake pedal depression indicative signal disappears subsequently when the automatic transmission operates in said predetermined automatic drive range.

15. In an automotive vehicle including a brake pedal, and an automatic transmission having a predetermined gear position:

means for detecting a demand for engine brake running of the automotive vehicle when the automatic transmission operates in a predetermined automatic drive range;

means for detecting a present gear position which the automatic transmission is conditioned in;

means for determining a new gear position in accordance with a predetermined shift schedule;

means for setting one of a first indicator and a second indicator in response to said present gear position detected and said demand for engine brake running detected;

said first indicator being indicative of a gear position higher than and adjacent to the predetermined gear position, said second indicator being indicative of the predetermined gear position;

means for comparing said new gear position that is determined in accordance with said predetermined shift schedule and that gear position which is indicated by said one of said first or second indicators that is set and setting as a target gear position a lower one of said new gear position that is determined in accordance with the predetermined shift schedule and said gear position which is indicated by that one indicator which is set;

means for shifting the automatic transmission from said present gear position to said target gear position;

means for conditioning the automatic transmission for engine brake running when one of said first and second indicators is set;

means for detecting a release of the brake pedal after said demand for engine brake running has been detected; and means for resetting said second indicator when said release of the brake pedal is detected.

16. A method for engine brake running control for an automotive vehicle including a brake pedal, and an automatic transmission, the automatic transmission being shiftable to a predetermined gear position when the automatic transmission operates in a predetermined automatic drive range, the method comprising the steps of:

detecting a depression of the brake pedal and generating a brake pedal depression indicative signal indicative of said depression of the brake pedal;

detecting a present gear position which the automatic transmission is conditioned in and generating a present gear position indicative signal indicative of said present gear position detected;

selecting, out of a predetermined group of gear positions including the predetermined gear position, a new gear position lower than said present gear position in accordance with said present gear position indicative signal and at least one variable which the automotive vehicle is involved in as long as said brake pedal depression indicative signal is generated when the automatic transmission operates in the predetermined automatic drive range;

effecting a downshift from said present gear position in the automatic transmission to said new gear position when the automatic transmission operates in the predetermined automatic drive range;

conditioning the automatic transmission for engine brake running at said new gear position as long as said brake pedal depression indicative signal is generated when the automatic transmission operates in the automatic drive range; and preventing the automatic transmission from being conditioned for engine brake running at the predetermined gear position when said brake pedal depression indicative signal disappears subsequently when the automatic transmission operates in the predetermined automatic drive range.

17. A method for engine brake running control for an automotive vehicle including a brake pedal, and an automatic transmission, the automatic transmission being shiftable to a predetermined gear position in accordance with a predetermined shift schedule when the automatic transmission operates in a predetermined automatic drive range, the method comprising the steps of:

detecting a demand for engine brake running of the automotive vehicle when the automatic transmission operates in the predetermined automatic drive range;

detecting a present gear position which the automatic transmission is conditioned in;

setting one of a first indicator and a second indicator in response to said present gear position detected and said demand for engine brake running, said first indicator being indicative of a gear position higher than and adjacent to the predetermined gear position, said second indicator being indicative of the predetermined gear position;

comparing a gear position that is determined in accordance with the predetermined shift schedule and that gear position which is indicated by said one of said first or second indicators that is set and setting as a new gear position a lower one of said gear position that is determined in accordance with the predetermined shift schedule and that gear position which is indicated by said one indicator that is set;

shifting the automatic transmission from said present gear position to said new gear position;

conditioning the automatic transmission for engine brake running when one of said first and second indicators is set;

detecting a release of the brake pedal after said demand for engine brake running has been detected; and resetting said second indicator when said release of the brake pedal is detected.

18. A method for engine brake running control for an automotive vehicle including an automatic transmission, an accelerator pedal, and a foot brake, the automatic transmission including an input shaft and an output shaft and being automatically shiftable to a predetermined gear position when a forward drive range is selected, the method comprising the steps of:

detecting whether the forward drive range is selected or not and generating a forward drive range selection signal indicative of the fact that the forward drive range is selected;

detecting whether the accelerator pedal is released or not and generating an accelerator pedal release indicative signal indicative of the fact that the accelerator pedal is released;

detecting whether the foot brake is depressed or not and generating a foot brake depression indicative signal indicative of the fact that the foot brake is depressed;

detecting a velocity of the output shaft of the automatic transmission and generating a velocity indicative signal indicative of said velocity of the output shaft;

determining out of said velocity indicative signal a deceleration which the automotive vehicle is subject to and generating a deceleration indicative signal indicative of said deceleration determined;

detecting a present gear position which the automatic transmission is conditioned in and generating a present gear position indicative signal indicative of said present gear position detected;

preparing a plurality of indicators including a first indicator and a second indicator, said first indicator being indicative of a gear position higher than and next adjacent to the predetermined gear position and said second indicator being indicative of the predetermined gear position;

setting one indicator of said plurality of indicators in response to said present gear position indicative signal and said deceleration indicative signal when said forward drive range selection signal, said accelerator pedal release indicative signal, and said foot brake depression indicative signal are all present;

resetting said second indicator in response to an absence of said foot brake depression indicative signal when said forward drive range selection signal and said accelerator pedal release signal are both present; and conditioning the automatic transmission for engine brake running in response to said one of said plurality of indicators which has been set.

19. In an automotive vehicle including a brake pedal, and an automatic transmission having a predetermined gear position, a method for engine brake running control comprising the steps of:

detecting a depression of the brake pedal and generating a brake pedal depression indicative signal indicative of said depression of the brake pedal;

determining a deceleration which the automotive vehicle is subject to and generating a deceleration indicative signal indicative of said deceleration determined;

detecting a present gear position which the automatic transmission is conditioned in and generating a present gear position indicative signal indicative of the present gear position detected;

determining a first new gear position in accordance with a predetermined shift schedule when the automatic transmission operates in a predetermined automatic drive range;

selecting, out of a predetermined group of gear positions including the predetermined gear position, a second new gear position lower than said present gear position in accordance with said present gear position indicative signal and said deceleration indicative signal as long as said brake pedal depression indicative signal is generated when the automatic transmission operates in said predetermined automatic drive range;

comparing a parameter of the new gear position with a parameter of the second new gear position and setting as a target gear position a lower one of said first new gear position and said second new gear position;

effecting a downshift from said present gear position in the automatic transmission to said target gear position when the automatic transmission operates in said predetermined automatic drive range;

conditioning the automatic transmission for engine brake running at said target gear position as long as said brake pedal depression indicative signal is generated when the automatic transmission operates in said predetermined automatic drive range; and preventing the automatic transmission from being conditioned for engine brake running at the predetermined gear position when said brake pedal depression indicative signal disappears subsequently when the automatic transmission operates in said predetermined automatic drive range.

20. In an automotive vehicle including a brake pedal, and an automatic transmission having a predetermined gear position, a method for engine brake running control comprising the steps of:

detecting a demand for engine brake running of the automotive vehicle when the automatic transmission operates in a predetermined automatic drive range;

detecting a present gear position which the automatic transmission is conditioned in;

determining a new gear position in accordance with a predetermined shift schedule;

setting one of a first indicator and a second indicator in response to said present gear position detected and said demand for engine brake running detected;

said first indicator being indicative of a gear position higher than and adjacent to the predetermined gear position, said second indicator being indicative of the predetermined gear position;

comparing said new gear position that is determined in accordance with said predetermined shift schedule and that gear position which is indicated by said one of said first or second indicators that is set and setting as a target gear position a lower one of said new gear position that is determined in accordance with said predetermined shift schedule and said gear position which is indicated by said one indicator that is set;

shifting the automatic transmission from said present gear position to said target gear position;

conditioning the automatic transmission for engine brake running when one of said first and second indicators is set;

detecting a release of the brake pedal after said demand for engine brake running has been detected; and resetting said second indicator when said release of the brake pedal is detected.

* * * * *